Dec. 21, 1926.

A. M. POPKIN

SAFETY BLOW-OFF COCK

Filed Sept. 30, 1925

1,611,674

WITNESSES
Edw. Thorpe
A.W.Roskr

INVENTOR
Aaron M. Popkin
BY
ATTORNEYS

Patented Dec. 21, 1926.

1,611,674

UNITED STATES PATENT OFFICE.

AARON M. POPKIN, OF BROOKLYN, NEW YORK.

SAFETY BLOW-OFF COCK.

Application filed September 30, 1925. Serial No. 59,684.

This invention relates to safety blow-off cocks, an object of the invention being to provide means in the form of an attachment for the casing of the valve, which can be used on any standard type of valve casing, and which will prevent the possibility of the valve being knocked or otherwise forced out of the casing.

Valve cocks of this character are provided with conical turning plugs, which are tightened in the casing by means of nuts screwed onto studs at the lower ends of the valves. It happens that these valves stick after continued use or continued non-use and it is quite difficult, if not impossible, to turn them. When this happens with the ordinary valve, the nut is removed and a blow is imparted to the end of the stud to force the valve longitudinally. When this is done, sometimes the valve is driven entirely out of the casing and serious accidents result, and it is the purpose of my invention to provide a safety device which constitutes an attachment for the casing and which absolutely prevents this knocking out or accidental removal of the valve and hence prevents accidents such as above referred to.

With these and other objects in view, the invention consists in certain novel features of construction and combinations and arrangements of parts, which will be more fully hereinafter described and pointed out in the claim.

In the accompanying drawings—

Figure 1:
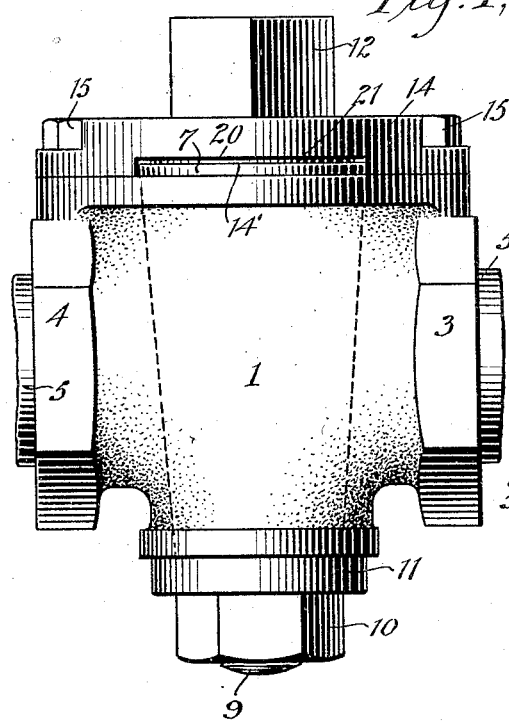
Figure 1 is a view in side elevation, illustrating my improved attachment operatively connected to the valve casing of a blow-off cock.
Figure 2:
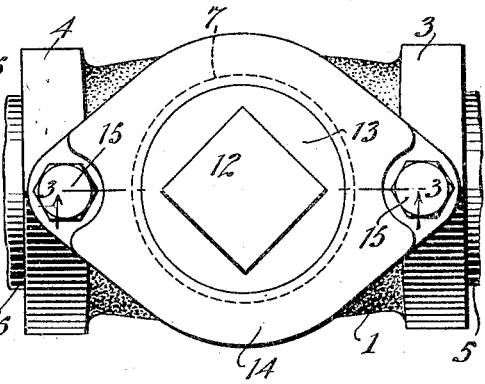
Figure 2 is a top plan view of Figure 1.
Figure 3:
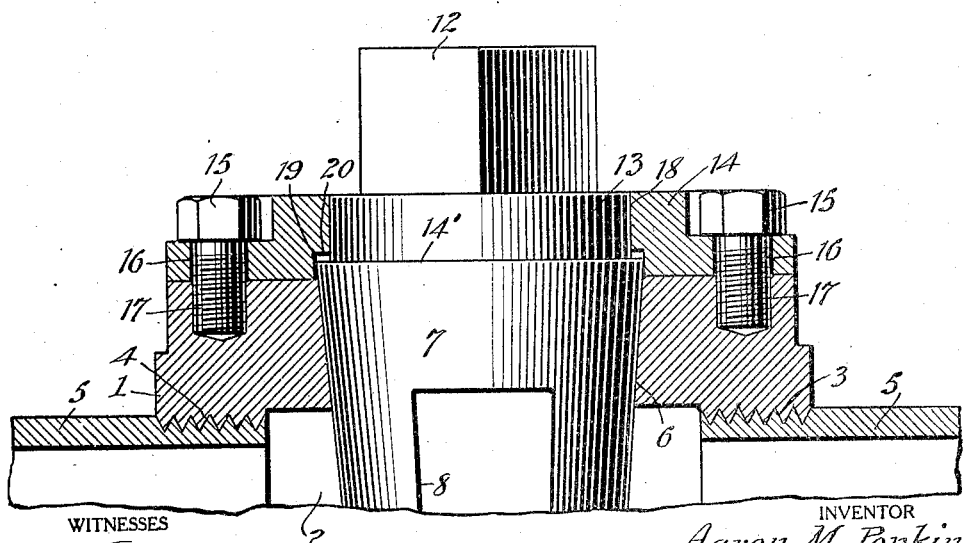
Figure 3 is an enlarged fragmentary view in longitudinal section, the valve being shown in elevation.

1 represents the casing of a blow-off cock having a passage 2 therethrough communicating with a threaded inlet 3 and an outlet 4, adapted to be connected to suitable pipes, as clearly shown in Figure 3.

The casing 1 is formed with a tapering bore 6 extending across the passage 2, and in this bore the conical valve 7 is located and is provided with a passage 8 which may be positioned in line with the passage 2 or at an angle thereto, as is customary in the art.

The valve 7 at its lower end has a screw threaded stud 9 on which a nut 10 is located, with a washer 11 located on the stud and interposed between the nut and the valve casing. By turning this nut 10 in one direction the valve 7 is moved longitudinally to tighten or loosen the same relative to the conical bore 6.

These valves 7 are provided with angular enlargements 12 at their upper ends for the reception of a crank or wrench to turn the same, and some of said valves have cylindrical portions 13 between the larger ends of the valves and the enlargements 12. If such cylindrical portions are not provided, I propose to form such cylindrical portions thereon which are of less diameter than the largest diameter of the valves so that annular shoulders 14' are formed on the valves.

My invention specifically comprises a plate or cap 14 which is secured at its ends by cap screws 15 to the casing 1, said screws being projected through openings 16 in the plate 14 and screwed into threaded recesses 17 in casing 1.

The plate 14 has an opening 18 in the center thereof which receives the cylindrical portion 13 of the valve, and the lower face of said valve adjacent said cylindrical opening 18 is made with an annular recess 19 receiving the larger end of valve 7 and providing a shoulder 20 which is adapted to be engaged by the valve 7 if the latter is moved in a direction tending to force the valve out of the casing. Hence by the provision of such a cap plate, the operator is enabled to release the valve by a bolt on the stud 9, but he cannot possibly drive the valve entirely out of the valve casing as the upper end of the valve will engage the shoulder 20.

I preferably recess the sides of the plate 14, as shown at 21, so that openings are formed through which the larger end of the valve is exposed and which discloses the amount of clearance between the valve and the plate, and which allows for cleaning out the space in the event there should be any accumulation of dirt or other foreign matter therein.

Various slight changes and alterations might be made in the general form of the parts described without departing from my invention, and hence I do not limit myself to the precise details set forth but consider myself at liberty to make such slight changes and alterations as fairly fall within the spirit and scope of the appended claim.

I claim:

A blow-off cock comprising a casing, a conical plug valve therein having its smaller end extending outside of the casing, said valve having a cylindrical portion adjacent the larger end of the valve and of less diameter than said larger end, of a plate removably secured to the valve casing and having an opening therein receiving the cylindrical portion of the valve, said plate having a recess in its lower face extending throughout the transverse dimension of the plate and receiving the larger diameter of the valve and providing a shoulder against which said larger diameter of the valve is adapted to engage when the valve is forced longitudinally.

AARON M. POPKIN.